US011991725B2

(12) United States Patent
Li

(10) Patent No.: US 11,991,725 B2
(45) Date of Patent: May 21, 2024

(54) DOWNLINK DATA TRANSMISSION METHOD AND DEVICE, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 448 days.

(21) Appl. No.: 17/607,362

(22) PCT Filed: Apr. 29, 2019

(86) PCT No.: PCT/CN2019/085067
§ 371 (c)(1),
(2) Date: Oct. 28, 2021

(87) PCT Pub. No.: WO2020/220228
PCT Pub. Date: Nov. 5, 2020

(65) Prior Publication Data
US 2022/0225320 A1     Jul. 14, 2022

(51) Int. Cl.
*H04W 72/04*     (2023.01)
*H04W 16/28*     (2009.01)
(Continued)

(52) U.S. Cl.
CPC .......... *H04W 72/51* (2023.01); *H04W 16/28* (2013.01); *H04W 72/0446* (2013.01); *H04W 72/23* (2023.01)

(58) Field of Classification Search
CPC . H04W 72/51; H04W 72/0446; H04W 72/23; H04L 5/0023; H04L 5/0044; H04L 5/0094; H04L 5/0053
See application file for complete search history.

(56) References Cited

U.S. PATENT DOCUMENTS 6,850,497 B1    2/2005  Sigler
2007/0093271 A1    4/2007  Omri et al.
(Continued)

FOREIGN PATENT DOCUMENTS

CA     2185949 A1     3/1997
CN     108282869 A    7/2018
(Continued)

OTHER PUBLICATIONS

Kazuaki Takeda, NTT DoCoMo, Inc. "New Radio (NR) Access Technology", 3GPP TSG RAN meeting #76 RP-171137, West Palm Beach, USA, Jun. 5-8, 2017,(218p).

(Continued)

*Primary Examiner* — Jamal Javaid
(74) *Attorney, Agent, or Firm* — Arch & Lake LLP

(57) ABSTRACT

A method, apparatus, and a non-transitory computer-readable storage medium for downlink data transmission are provided. The method may be applied to a terminal. The terminal receives downlink control information. The downlink control information includes time domain locations of at least two mini-slots for downlink reception. The terminal may include N antenna panels. N may be an integer greater than or equal to 1. The time domain location of the at least one mini-slot may be determined according to the information of a mini-slot interval threshold. The information of the mini-slot interval threshold may be determined according to the antenna capability information of N antenna panels. The information of the micro-slot interval threshold may be used to indicate the minimum time domain interval between adjacent mini-slots where the terminal receives downlink data.

20 Claims, 9 Drawing Sheets

(51) Int. Cl.
*H04W 72/0446* (2023.01)
*H04W 72/23* (2023.01)
*H04W 72/51* (2023.01)

(56) References Cited

U.S. PATENT DOCUMENTS

| | | |
|---|---|---|
| 2018/0302895 A1 | 10/2018 | Akkarakaran et al. |
| 2018/0317225 A1 | 11/2018 | Akkarakaran et al. |
| 2019/0326976 A1 | 10/2019 | Hu et al. |
| 2019/0327756 A1 | 10/2019 | Guan et al. |
| 2019/0349915 A1 | 11/2019 | Ahn et al. |
| 2021/0204266 A1 | 7/2021 | Ahn et al. |

FOREIGN PATENT DOCUMENTS

| | | | |
|---|---|---|---|
| CN | 108811125 | A | 11/2018 |
| CN | 108811173 | A | 11/2018 |
| CN | 109391948 | A | 2/2019 |
| CN | 109565889 | A | 4/2019 |
| CN | 109672514 | A | 4/2019 |
| EP | 1845744 | A1 | 10/2007 |
| JP | 2004320521 | A | 11/2004 |
| WO | 2018126996 | A1 | 7/2018 |
| WO | 2018128351 | A1 | 7/2018 |
| WO | 2018232090 | A1 | 12/2018 |
| WO | 2019019008 | A1 | 1/2019 |
| WO | 2019029417 | A1 | 2/2019 |

OTHER PUBLICATIONS

Li Yu-mei, Zhang Shu, "Opportunistic Beamforming Performance Simulation in MIMO System Based on the Beam Selection in the Mini-Slot", Communication and Information Processing, Automation Technology and Application, vol. 28,No. 8, 2009,(4p).
Sun Xiao-dong,et,al. "Performance Analysis of Upstream Channel MAC Layer Protocol in HFC Networks", ACTA Electronica Sinica, vol. 30,No. 2, Feb. 2002,(4p).
First Office Action issued in the Chinese application No. 201980000789.1, dated Sep. 21, 2022, with English translation, (18p).
Supplementary European Search Report in the European application No. 19927379.8, dated on Nov. 4, 2022, (10p).
English translation of the Written Opinion of the International Search Authority in the international application No. PCT/CN2019/085067, mailed on Jan. 19, 2020, (3p).
International Search Report of PCT Application No. PCT/CN2019/085067 dated Jan. 19, 2020 with English translation, (4p).
3GPP tsg_ran\tsg_ran, Issue tsgr_82, Qualcomm Europe Inc.—Spain, RP-182767, "TR 38.889 v1.1.0 on Study on NR-based access to unlicensed spectrum; for approval", Dec. 11, 2018, (120p).
Hongxing, Wang et al, Research on the Optimum Detection Threshold of Pulse Interval Modulation in Wireless Optical Communication, Ship Electronic Engineering, Issue 08, Aug. 20, 2008, (5p).

Downlink control information is received, the downlink control information includes time domain locations of at least two mini-slots for downlink reception, a time domain position of at least one mini-slot is determined according to mini-slot interval threshold value information, and the mini-slot interval threshold value information is determined according to antenna capability information of the N antenna panels

Downlink control information is transmitted to the terminal, the downlink control information includes time domain locations of at least two mini-slots for downlink reception, a time domain position of at least one mini-slot is determined according to mini-slot interval threshold value information, and the mini-slot interval threshold value information is determined according to antenna capability information of N antenna panels of a terminal ⎯ 301

FIG. 3

DOWNLINK DATA TRANSMISSION METHOD AND DEVICE, AND STORAGE MEDIUM

CROSS-REFERENCE TO RELATED APPLICATION

This application is the U.S. national phase application of International Application No. PCT/CN2019/085067, filed on Apr. 29, 2019, the entire contents of which are incorporated hereby by reference for all purposes.

TECHNICAL FIELD

The embodiments of the present disclosure relate to the field of communication technologies, and in particular to a method and a device for downlink data transmission and a storage medium.

BACKGROUND

In the fifth generation mobile communication (5G), due to the high attenuation in high-frequency channels, in order to ensure coverage, the transmission and reception are performed in a beam-based manner.

In the related art, many devices in the 5G system have a plurality of antenna panels, and data transmission and reception is performed in cooperation through the plurality of antenna panels. Therefore, when a base station performs multiple downlink transmissions to a terminal, the terminal may receive through different beams or even different antenna panels. At present, there is no perfect solution regarding how to configure a time domain interval between a plurality of downlink transmissions when the base station performs the plurality of downlink transmissions to the terminal.

SUMMARY

The embodiments of the present disclosure provide a method and a device for downlink data transmission and a storage medium. The technical solutions are described as follows.

According to a first aspect of the present disclosure, a method for downlink data transmission is provided. The method may be executed by a terminal. The terminal may receive downlink control information. The downlink control information may include time domain locations of at least two mini-slots for downlink reception. The terminal may include N antenna panels. N may be an integer greater than or equal to 1. A time domain position of at least one mini-slot may be determined according to mini-slot interval threshold value information. The mini-slot interval threshold value information may be determined according to antenna capability information of the N antenna panels. The mini-slot interval threshold value information may indicate a minimum time domain interval between adjacent mini-slots in which the terminal receives downlink data.

According to a second aspect of the present disclosure, a method for downlink data transmission is provided. The method may be applied to a base station. The base station may transmit downlink control information to a terminal. The downlink control information may include time domain locations of at least two mini-slots for downlink reception. A time domain position of at least one mini-slot may be determined according to mini-slot interval threshold value information. The mini-slot interval threshold value information may be determined according to antenna capability information of the N antenna panels in the terminal. The mini-slot interval threshold value information may indicate a minimum time domain interval between adjacent mini-slots in which the terminal receives downlink data. N may be an integer greater than or equal to 1.

According to a third aspect of the present disclosure, a computing device is provided. The computing device may include one or more processors, a non-transitory computer-readable memory storing instructions executable by the one or more processors, and a receiver. The one or more processors may be configured to control the receiver to receive downlink control information. The downlink control information may include time domain locations of at least two mini-slots for downlink reception. A time domain position of at least one mini-slot may be determined according to mini-slot interval threshold value information. The mini-slot interval threshold value may be determined according to antenna capability information of the N antenna panels. The mini-slot interval threshold value information may indicate a minimum time domain interval between adjacent mini-slots in which the terminal receives downlink data. The terminal may include N antenna panels. N may be an integer greater than or equal to 1.

It is to be understood that the foregoing general description and the following detailed description are only exemplary and explanative and are not restrictive of the disclosure.

BRIEF DESCRIPTION OF THE DRAWINGS

The accompanying drawings herein are incorporated in and form part of the specification, and illustrate embodiments conforming to the disclosure, and explain the principles of the disclosure together with the specification.

FIG. 2 is a method flowchart of a method for downlink data transmission according to an exemplary embodiment of the present disclosure;

FIG. 3 is a method flowchart of a method for downlink data transmission according to an exemplary embodiment of the present disclosure;

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The network architecture and the service scenarios described in the embodiments of the present disclosure are intended to explain the technical solutions of the embodiments of the present disclosure more clearly, rather than limiting the technical solutions provided in the embodiments of the present disclosure. A person of ordinary skill in the art will appreciate that the technical solutions provided in the embodiments of the present disclosure are equally applicable to similar technical problems with the evolution of the network architecture and the emergence of new service scenarios.

Figure 1:
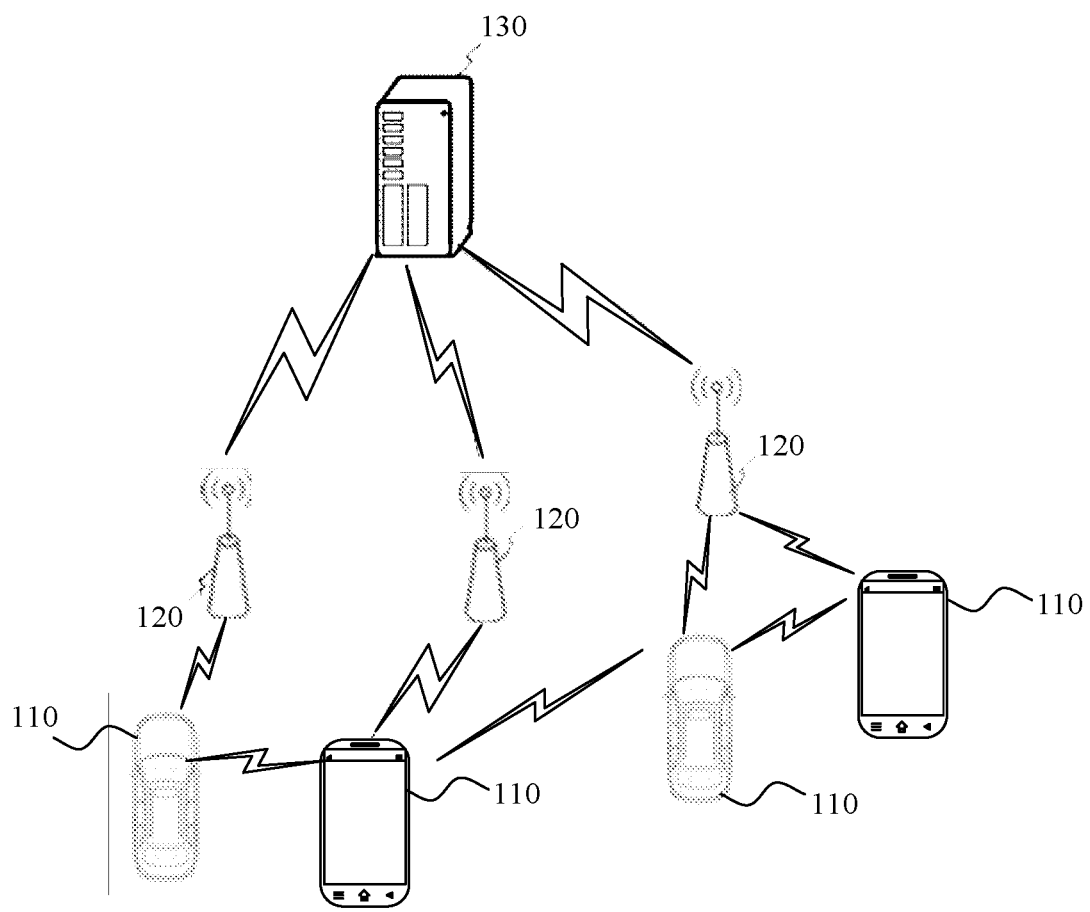
FIG. 1 is a schematic structural diagram of a wireless communication system according to an embodiment of the present disclosure.

Referring to FIG. 1, a schematic structural diagram of a wireless communication system according to an embodiment of the present disclosure is shown. As shown in FIG. 1, a wireless communication system is a communication system based on cellular mobile communication technology, and the wireless communication system may include a plurality of terminals 110 and a plurality of base stations 120.

The terminal 110 may be a device that provides voice and/or data connectivity to a user. The terminal 110 may communicate with one or more core networks via a Radio Access Network (RAN). The terminal 110 may be an Internet of Things terminal, such as a sensor device, a mobile phone (or referred to as cellular phone) and a computer having an Internet of Things terminal, and may be for example a fixed, portable, pocket-sized, handheld, computer built-in, or vehicle-mounted device. For example, a station (STA), a subscriber unit, a subscriber station, a mobile station, a mobile, a remote station, an access point, a remote terminal, an access terminal, a user terminal, a user agent, a user device or a user equipment (UE). Alternatively, the terminal 110 may be a device of an unmanned aerial vehicle. Alternatively, the terminal 110 may also be a vehicle-mounted device, for example, a trip computer having a wireless communication function, or a wireless communication device connected to the trip computer. trip computer, the terminal 110 may also be a roadside device, for example, a street lamp, a signal lamp or other roadside device having a wireless communication function.

The base station 120 may be a network side device in a wireless communication system. The wireless communication system may be a fourth generation mobile communication (4G) system, also known as a Long Term Evolution (LTE) system. Alternatively, the wireless communication system may be a 5G system, also known as a new radio (NR) system or a 5G NR system. Alternatively, the wireless communication system may be a further next generation system of a 5G system. The access network in the 5G system may be referred to as a New Generation-Radio Access Network (NG-RAN).

The base station 120 may be an evolved NodeB (eNB) used in a 4G system. Alternatively, the base station 120 may be a base station using a centralized distributed architecture in a 5G system (gNB). When the base station 120 adopts a centralized distributed architecture, the base station generally includes a central unit (CU) and at least two distributed units (DUs). The centralized unit is provided with protocol stacks of a Packet Data Convergence Protocol (PDCP) layer, a Radio Link Control (RLC) layer, and a Media Access Control (MAC) layer. The distributed unit is provided with a Physical (PHY) layer protocol stack. The specific implementation of the base station 120 is not limited in the embodiments of the present disclosure.

A wireless connection may be established between the base station 120 and the terminal 110 via a radio air interface. In various embodiments, the radio air interface is a radio air interface based on the 4G standard. Alternatively, the radio air interface is a radio air interface based on the 5G standard, for example, the radio air interface is a new air interface. Alternatively, the radio air interface may be a radio air interface based on the next generation mobile communication network technology standard of 5G.

Optionally, an End to End (E2E) connection or a device to device (D2D) connection may also be established between terminals 110, for example, scenarios such as vehicle to vehicle (V2V) communication, vehicle to Infrastructure (V2I) communication, and vehicle to pedestrian (V2P) communication in vehicle to everything (V2X).

When a connection is established between terminals, if one or more of the terminals function as a base station in communication between terminals, the one or more of the terminals may also be regarded as the base station 120 and the remaining terminals may be regarded as the terminal 110.

For example, in the V2X scenario, the vehicle-mounted terminal A reports its capability information (for example, antenna capability information) to another vehicle-mounted terminal B. The vehicle-mounted terminal B controls communication between the vehicle-mounted terminal A and the vehicle-mounted terminal B according to the capability information. In other words, the vehicle-mounted terminal B acts as a head car in the vehicle network. In this case, the vehicle-mounted terminal B may be regarded as the above-described base station 120, and the vehicle-mounted terminal A may be regarded as the above-described terminal 110.

Optionally, the above wireless communication system may further include a network management device 130.

Each of a plurality of base stations 120 is connected to the network management device 130. The network management device 130 may be a core network device in a wireless communication system. For example, the network management device 130 may be a Mobility Management Entity (MME) in an Evolved Packet Core (EPC). Alternatively, the network management device may be another core network device, such as a Serving GateWay (SGW), a Public Data Network GateWay (PGW), a Policy and Charging Rules Function (PCRF) unit, or a Home Subscriber Server (HSS), etc. The implementation form of the network management device 130 is not limited in the embodiments of the present disclosure.

In the 5G NR system, especially when the communication frequency band is in Frequency range 2 (above 6 GHz), due to the fast attenuation at high-frequency channels, in order to ensure coverage, beam-based transmission and reception is required between the terminal and the base station.

Currently, in the related art, in an actual application scenario, the base station usually transmits data to the user by using one antenna panel. When all data are transmitted using one antenna panel by the base station, since the same antenna panel can only point to one beam direction simultaneously, the terminal receives the downlink data transmitted by the base station by using one beam direction, that is, one receiving beam. The receiving beam is generally indicated by a Transmission Configuration Indication (TCI) state, and each TCI state corresponds to a Reference Signal (RS) index, also referred to as RS index, which is used to uniquely indicate an RS. Different RSs have different RS identifiers. Optionally, in the embodiment of the present disclosure, RS may be Non-Zero Power Channel State Information Reference Signal (NZP CSI-RS), Synchronization Signal Block (SSB), or other reference signals, which are not limited in the embodiment of the present disclosure. Referring to Table 1, which shows a correspondence table between the TCI states and the RS indexes according to the embodiment of the present disclosure, Table 1 includes the correspondence between the TCI states and the RS indexes.

| TCI state | RS index |
| --- | --- |
| TCI#0 | SSB index#1 |
| TCI#1 | SSB index#2 |
| TCI#2 | CSI-RS index#5 |
| TCI#3 | CSI-RS index#6 |
| ... | ... |

For example, when the base station informs the terminal through the DCI that the TCI state of the terminal is TCI #1, the base station informs the terminal to receive downlink data on the PDSCH using a receiving beam for receiving the SSB index #2.

In the 5G NR system, a base station and a terminal may transmit data by using multiple antenna panels. For a scenario of multiple antenna panels, the base station may have multiple antenna panels that may point to different beam directions. The base station may transmit downlink data to the terminal through transmitting beams on the multiple antenna panels, or may receive uplink data transmitted by the terminal through receiving beams on the multiple antenna panels. The multiple antenna panels may belong to a same Transmitter Receiver Point (TRP), or may belong to a plurality of different TRPs. That is, one base station may have one or more TRPs, each TRP may have one or more antenna panels, and different antenna panels may correspond to different beam directions.

Similarly, the terminal may have a plurality of antenna panels. The terminal may receive downlink data transmitted by the base station through respective beams on the plurality of antenna panels, or may transmit uplink data to the base station through respective beams on the plurality of antenna panels.

In the NR system, a Multiple-Input Multiple-Output (MIMO) technology needs to support Ultra Reliable Low Latency Communication (URLLC) service. In order to ensure reliability, a same Transport Block (TB) in the URLLC service needs to be repeatedly transmitted. Repeated transmission and reception using different antenna panels may further use spatial diversity to improve reliability. That is, if a same TB is repeatedly transmitted N times, the time domain resources and TCI states used may be different, and other resources such as frequency-domain resource, a modulation encoding scheme, a Hybrid Automatic Repeat reQuest (HARQ) number and the like may be the same. If each time of transmission of the TB is scheduled by separate DCI signaling, the overhead of the DCI signaling is large. Therefore, it is necessary to design new DCI signaling to schedule repeated transmission of TBs using different TCI states at different times.

For a plurality of repeated transmissions, a time granularity occupied for each transmission may be a mini-slot, that is, 1-13 Orthogonal Frequency Division Multiplexing (OFDM) symbols. That is, multiple transmissions are performed in a slot, and multiple transmissions may require the terminal to use different beams or even different panels for reception. Because a period of time is required by the terminal for switching the beams or the antenna panels to receive the downlink data, during two consecutive transmissions in which the terminal is required to switch beams or antenna panels for reception, a certain time domain interval exists between the two min-slots corresponding to the two consecutive transmissions. If the time domain interval is set too large, a duration between the two transmissions is long, which affects the data transmission efficiency. If the time domain interval is set too small, there may not be enough time for the terminal to complete switching of the beams or the antenna panels after receiving the previous mini-slot. At present, there is no suitable solution for how to set the time domain interval between the above two mini-slots.

Referring to FIG. 2, which shows a method flowchart of a method for downlink data transmission according to an exemplary embodiment of the present disclosure, the method may be applied to the wireless communication system shown in FIG. 1, and is executed by a terminal in the wireless communication system. The terminal includes N antenna panels, N is an integer greater than or equal to 1. As shown in FIG. 2, the method may include the following operations.

In 201, downlink control information is received. The downlink control information includes time domain locations of at least two mini-slots for downlink reception.

A time domain position of at least one mini-slot is determined according to mini-slot interval threshold value information, and the mini-slot interval threshold value information is determined according to antenna capability information of the N antenna panels. The mini-slot interval threshold value information indicates a minimum time domain interval between adjacent mini-slots in which the terminal receives downlink data.

Optionally, the method further includes operations as follows.

A time domain interval between every two adjacent mini-slots in the at least two mini-slots is obtained from the downlink control information.

A beam relationship is determined according to the time domain interval between every two adjacent mini-slots in the at least two mini-slots, and the beam relationship indicates a relationship between receiving beams of the at least two mini-slots.

Respective receiving information of the at least two mini-slots is obtained according to the beam relationship and the downlink control information, and the receiving information indicates an antenna panel and a receiving beam for receiving a corresponding mini-slot.

The downlink data is received in a time domain corresponding to the at least two mini-slots according to respective receiving information of the at least two mini-slots.

Optionally, the operation that the beam relationship is determined according to the time domain interval between every two adjacent mini-slots in the at least two mini-slots includes operations as follows.

The mini-slot interval threshold value information is obtained.

For any two adjacent mini-slots of the at least two mini-slots, a magnitude relationship between a time domain interval between the two adjacent mini-slots and a time domain interval indicated by the mini-slot interval threshold value information is obtained.

A relationship between receiving beams of the two adjacent mini-slots is determined according to the magnitude relationship.

Optionally, the mini-slot interval threshold value information includes at least one of a first time domain interval threshold value T1, a second time domain interval threshold value T2, a third time domain interval threshold value T3, a fourth time domain interval threshold value T4, and a fifth time domain interval threshold value T5.

T1 is a minimum time domain interval for successively receiving downlink data sent in different mini-slots through two antenna panels responsive to that the two antenna panels are capable of being activated simultaneously.

T2 is a minimum time domain interval for successively receiving downlink data sent in different mini-slots through the two antenna panels responsive to that the two antenna panels are not capable of being activated simultaneously.

T3 is a minimum time domain interval for successively receiving downlink data sent in different mini-slots through the two antenna panels responsive to that the two antenna panels are capable of being activated simultaneously and the two antenna panels are capable of performing downlink reception simultaneously.

T4 is a minimum time domain interval for successively receiving downlink data sent in different mini-slots through the two antenna panels responsive to that the two antenna panels are capable of being activated simultaneously and the two antenna panels are not capable of performing downlink reception simultaneously.

T5 is a minimum time domain interval for successively receiving downlink data sent in different mini-slots through a same antenna panel using different receiving beams.

Optionally, the respective receiving information of the at least two mini-slots is obtained according to the beam relationship and the downlink control information includes operations as follows.

For a specified mini-slot of the at least two mini-slots, receiving information corresponding to the downlink control information is obtained as receiving information of the specified mini-slot, a time domain interval between a starting time domain position of the specified mini-slot and an ending time domain position of the downlink control information is less than a specified time domain interval threshold value.

For other mini-slot, receiving information of the other mini-slot is obtained from the downlink control information. The other mini-slot is a mini-slot of the at least two mini-slots other than the specified mini-slot.

Optionally, before the downlink control information is received, the method further includes: reporting antenna capability information of the N antenna panels.

The antenna capability information includes at least one of: a value of N; whether the N antenna panels are capable of being activated simultaneously when the value of N is greater than or equal to 2; and whether the N antenna panels are capable of performing downlink reception simultaneously when the value of N is greater than or equal to 2 and the N antenna panels are capable of being activated simultaneously.

Optionally, before the downlink control information is received, the method further includes: interacting antenna panel activation information with the base station. The antenna panel activation information indicates an activated antenna panel of the N antenna panels.

The mini-slot interval threshold value information is determined according to the antenna capability information of the N antenna panels and the antenna panel activation information.

In conclusion, according to the solution shown in the embodiments of the present disclosure, the base station determines the mini-slot interval threshold value information according to the antenna capability information, and transmits the downlink control information including the time domain positions of the at least two mini-slots for downlink reception to the terminal according to the determined mini-slot interval threshold value information, so as to control the terminal to receive the downlink data. Therefore, a solution of setting a mini-slot interval of downlink data in combination with the antenna capabilities of the terminal is provided, to avoid setting the time domain interval between adjacent mini-slots too large or too small, thereby improving the transmission efficiency for downlink transmission through the multi-antenna panels.

Referring to FIG. 3, which shows a method flowchart of a method for downlink data transmission according to an exemplary embodiment of the present disclosure, the method may be applied to the wireless communication system shown in FIG. 1, and executed by a base station in the wireless communication system. As shown in FIG. 3, the method may include the following operations.

In 301, downlink control information is transmitted to the terminal. The downlink control information includes time domain locations of at least two mini-slots for downlink reception.

A time domain position of at least one mini-slot is determined according to mini-slot interval threshold value information, the mini-slot interval threshold value information is determined according to antenna capability information of the N antenna panels in the terminal, the mini-slot interval threshold value information indicates a minimum time domain interval between adjacent mini-slots in which the terminal receives downlink data, and N is an integer greater than or equal to 1.

Optionally, before the downlink control information is transmitted to the terminal, the method further includes an operation as follows.

A time domain interval between every two adjacent mini-slots of the at least two mini-slots is determined according to the mini-slot interval threshold value information and respective receiving information of the at least two mini-slots. The receiving information indicates an antenna panel and a receiving beam of the terminal for receiving a corresponding mini-slot.

The operation that the downlink control information is transmitted to the terminal includes an operation as follows.

The downlink control information is transmitted to the terminal according to a time domain interval between every two adjacent mini-slots in the at least two mini-slots.

Optionally, the mini-slot interval threshold value information includes at least one of a first time domain interval threshold value T1, a second time domain interval threshold value T2, a third time domain interval threshold value T3, a fourth time domain interval threshold value T4 and a fifth time domain interval threshold value T5, T1 is a minimum time domain interval for successively receiving downlink data sent in different mini-slots through two antenna panels responsive to that the two antenna panels are capable of being activated simultaneously.

T2 is a minimum time domain interval for successively receiving downlink data sent in different mini-slots through the two antenna panels responsive to that the two antenna panels are not capable of being activated simultaneously.

T3 is a minimum time domain interval for successively receiving downlink data sent in different mini-slots through the two antenna panels are capable of being activated simultaneously and the two antenna panels are capable of performing downlink reception simultaneously.

T4 is a minimum time domain interval for successively receiving downlink data sent in different mini-slots through the two antenna panels responsive to that the two antenna panels are capable of being activated simultaneously e and the two antenna panels are not capable of performing downlink reception simultaneously.

T5 is a minimum time domain interval for successively receiving downlink data sent in different mini-slots through a same antenna panel using different receiving beams.

Optionally, the method further includes an operation as follows.

For a specified mini-slot of the at least two mini-slots, data in the specified mini-slot is received according to receiving information corresponding to the downlink control information. A time domain interval between a starting time domain position of the specified mini-slot and an ending time domain position of the downlink control information is less than a specified time domain interval threshold value.

Optionally, before the downlink control information is transmitted to the terminal, the method further includes: receiving antenna capability information of the N antenna panels reported by the terminal.

The antenna capability information includes at least one of: a value of N; whether the N antenna panels are capable of being activated simultaneously when the value of N is greater than or equal to 2; and whether the N antenna panels are capable of performing downlink reception simultaneously when the value of N is greater than or equal to 2 and the N antenna panels are capable of being activated simultaneously.

Optionally, before the downlink control information is transmitted to the terminal, the method further includes operations as follows.

Antenna panel activation information is interacted with the terminal, where the antenna panel activation information indicates an activated antenna panel of the N antenna panels.

The mini-slot interval threshold value information is determined according to the antenna panel activation information and the antenna capability information.

In conclusion, according to the solution shown in the embodiments of the present disclosure, the base station may determine the mini-slot interval threshold value information according to the antenna capability information of the at least one antenna panel of the terminal, and transmits the downlink control information including the time domain positions of the at least two mini-slots for downlink reception to the terminal according to the determined mini-slot interval threshold value information, so as to control the terminal to receive the downlink data. Therefore, a solution of setting a mini-slot interval of downlink data in combination with the antenna capabilities of the terminal is provided, to avoid setting the time domain interval between adjacent mini-slots too large or too small, thereby improving the transmission efficiency for downlink transmission through the multi-antenna panels.

According to the solution proposed in the foregoing embodiment of the present disclosure, whether the terminal needs to change the beam for receiving each transmission, and a time domain interval between every two consecutive transmissions may be set according to the information such as the antenna panel capability of the terminal and the number of antenna panels currently activated, and the time required for switching of antenna panels or beams. That is, the base station may obtain the antenna panel capability and the current antenna panel state information of the terminal, and, the base station may, based on the antenna panel capability and the current antenna panel state information of the terminal and in consideration of the time required for receiving beam switching by the terminal, configure a plurality of mini-slots for the terminal for transmitting a PDSCH, and configure receiving beam of the terminal for each mini-slot to receive the PDSCH.

Figure 4:
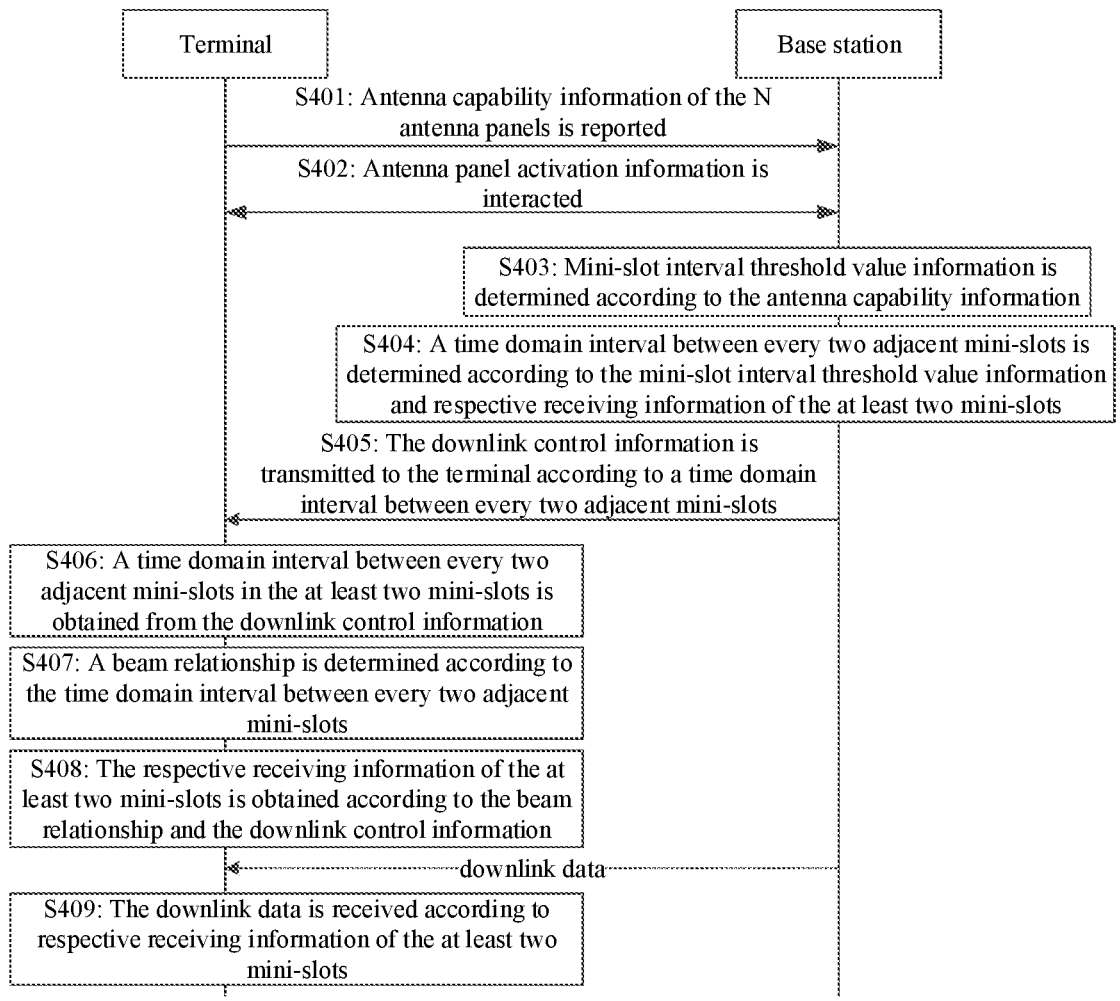
FIG. 4 is a method flowchart of a method for downlink data transmission according to an exemplary embodiment of the present disclosure.

Referring to FIG. 4, which shows a method flowchart of a method for downlink data transmission according to an exemplary embodiment of the present disclosure, the method may be applied to the wireless communication system shown in FIG. 1, and executed by a terminal and a base station in the wireless communication system. The terminal includes N antenna panels, N is an integer greater than or equal to 1. As shown in FIG. 4, the method may include the following operations.

In 401, the terminal reports antenna capability information of the N antenna panels to the base station, and accordingly the base station receives antenna capability information of the N antenna panels reported by the terminal.

Optionally, the antenna capability information includes at least one of: a value of N; whether the N antenna panels are capable of being activated simultaneously when the value of N is greater than or equal to 2; and whether the N antenna panels are capable of performing downlink reception simultaneously when the value of N is greater than or equal to 2 and the N antenna panels are capable of being activated simultaneously.

Regarding the value of N, in the embodiment of the present disclosure, the terminal may report the number of antenna panels included in the terminal to the base station. For example, when the terminal includes two antenna panels, the terminal may report 2 as the value of N to the base station.

Regarding whether the N antenna panels are capable of being activated simultaneously when the value of N is greater than or equal to 2, in the embodiment of the present disclosure, when the terminal includes two or more antenna panels, the terminal further reports to the base station whether the two or more antenna panels can be activated simultaneously.

For example, when the terminal has two antenna panel entities, the two antenna panel entities can be activated simultaneously. If there is only one antenna panel entity in the terminal, and the antenna panel entity can point to different directions at different times, it is considered that the terminal can activate only one antenna panel simultaneously.

Regarding whether the N antenna panels are capable of performing downlink reception simultaneously when the value of N is greater than or equal to 2 and the N antenna panels are capable of being activated simultaneously, in the embodiment of the present disclosure, when the terminal includes two or more antenna panels, and the two or more antenna panels can be activated simultaneously, the terminal may also report to the base station whether the two or more antenna panels can receive downlink data simultaneously, for example, whether the two or more antenna panels can receive a Physical Downlink Control Channel (PDCCH) and a Physical Downlink Shared Channel (PDSCH) simultaneously.

In 402, the terminal interacts antenna panel activation information with the base station. The antenna panel activation information indicates an activated antenna panel of the N antenna panels.

In the solution shown in the embodiment of the present disclosure, according to the antenna capability of the terminal, some information may also be interacted between the base station and the terminal, to determine which antenna state the terminal uses to communicate with the base station for the next period of time. A process of information interaction may include the following situations.

In a first situation, the base station generates antenna panel activation information according to the antenna capability information transmitted by the terminal, and transmits the antenna panel activation information to the terminal. Accordingly, the terminal receives the antenna panel activation information.

In a possible solution, the terminal first reports antenna panel capability information thereof, and the base station transmits an activation instruction to activate one or more antenna panels of the terminal according to the antenna panel capability information of the terminal. The terminal listens to the activation instruction of the base station, and activates the antenna panels according to the activation instruction. The activation indication in this solution is the above-described antenna panel activation information.

In a second situation, the base station transmits an antenna panel activation indication to the terminal according to the antenna capability information transmitted by the terminal. The terminal receives the antenna panel activation instruction, determines activated antenna panels of the N antenna panels according to the antenna panel activation instruction, generates antenna activation information according to the determined activated antenna panels, and transmits the antenna activation information to the base station. The base station receives the antenna panel activation information.

In another possible solution, the terminal first reports antenna panel capability information thereof, and the base station transmits an activation instruction according to the antenna panel capability information of the terminal, to activate one or more antenna panels of the terminal. The terminal may not completely listen to the activation instruction of the base station, and may activate the antenna panels according to the activation instruction and a desire thereof (for example, fewer antenna panels may be activated if power saving is desired; for example, more antenna panels may be activated if there is no need to save power and a large data rate is desired), and then the terminal feeds back information about activated antenna panels finally determined to the base station. In this solution, the information about activated antenna panels finally determined by the terminal is the above-described antenna panel activation information.

In the third situation, the terminal generates the antenna panel activation information according to the antenna capability information, and transmits the antenna panel activation information to the base station. The base station receives the antenna panel activation information.

In still another possible solution, the terminal reports antenna panel capability information thereof, determines the antenna panel to be activated, and then informs the base station of information about the antenna panel activated by the terminal. In this solution, the information about the antenna panel activated by the terminal is the above-described antenna panel activation information.

In this solution, the operation of reporting the antenna panel capability information and transmitting the antenna panel activation information to the base station by the terminal may be performed separately or synchronously.

In 403, the base station determines mini-slot interval threshold value information according to the antenna capability information. The mini-slot interval threshold value information indicates a minimum time domain interval between adjacent mini-slots in which the terminal receives downlink data.

Optionally, the mini-slot interval threshold value information includes at least one of a first time domain interval threshold value T1, a second time domain interval threshold value T2, a third time domain interval threshold value T3, a fourth time domain interval threshold value T4, and a fifth time domain interval threshold value T5. Each of the time domain interval threshold values may be described as follows.

T1 is a minimum time domain interval for successively receiving downlink data sent in different mini-slots through two antenna panels responsive to that the two antenna panels are capable of being activated simultaneously.

If the two antenna panels in the terminal can be activated simultaneously, the time of switching between the antenna panels is short. For example, if the terminal uses the antenna panel 1 to receive PDSCH in the first mini-slot and use the antenna panel 2 to receive PDSCH in the second mini-slot, a time domain interval between the first mini-slot and the second mini-slot is at least T1, which is the time required by the terminal to switch the antenna panels.

T2 is a minimum time domain interval for successively receiving downlink data sent in different mini-slots through the two antenna panels responsive to that the two antenna panels are not capable of being activated simultaneously.

For example, if two antenna panels in a terminal cannot be activated simultaneously, a time domain interval between two mini-slots received successively through the two antenna panels is at least T2.

T3 is a minimum time domain interval for successively receiving downlink data sent in different mini-slots through the two antenna panels responsive to that the two antenna panels are capable of being activated simultaneously and the two antenna panels are capable of performing downlink reception simultaneously.

In the embodiment of the present disclosure, it is considered to set T3 when a plurality of antenna panels in the terminal can be activated simultaneously. For example, if two antenna panels in the terminal can be activated simultaneously and can receive downlink data simultaneously, a time domain interval between two mini-slots received successively through the two antenna panels is at least T3. In a possible solution, a value of T3 may approach 0.

T4 is a minimum time domain interval for successively receiving downlink data sent in different mini-slots through the two antenna panels responsive to that the two antenna panels are capable of being activated simultaneously and the two antenna panels are not capable of performing downlink reception simultaneously.

For example, if two antenna panels in the terminal can be activated simultaneously and cannot receive downlink data simultaneously, and for example, the terminal wants to save power, a time domain interval between two mini-slots received successively through the two antenna panels is at least T4.

T5 is a minimum time domain interval for successively receiving downlink data sent in different mini-slots through a same antenna panel using different receiving beams.

In the embodiment of the present disclosure, if two mini-slots require the terminal to use different beams in the same antenna panel for PDSCH reception, the time domain interval between the two mini-slots is at least T5.

The values of the above five threshold values T1 to T5 can be preset by the system.

The above five thresholds T1 to T5 have a certain magnitude relationship, for example, T1 is less than T2, T3 is the smallest, and T4 is similar to T1.

Optionally, the base station may determine the mini-slot interval threshold value information according to the antenna panel activation information and the antenna capability information. That is, the mini-slot interval threshold value information is determined by the base station according to the antenna capability information and the antenna panel activation information of the N antenna panels in the terminal.

In the embodiment of the present disclosure, since the terminal may not activate all of the N antenna panels, but only some of the N antenna panels, when the base station transmits the downlink control information to the terminal, resource scheduling (including time-frequency resources scheduling and beam scheduling) may be performed in consideration of the antenna panel activation information in addition to the aforementioned mini-slot interval threshold value information.

In 404, the base station determines a time domain interval between every two adjacent mini-slots of the at least two mini-slots according to the mini-slot interval threshold value information and respective receiving information of the at least two mini-slots for transmitting downlink data to the terminal.

The receiving information indicates an antenna panel and a receiving beam of the terminal for receiving a corresponding mini-slot.

When transmitting the downlink data to the terminal, the base station may designate an antenna panel and a receiving beam (also referred to as a downlink beam) for receiving the downlink data for the terminal.

The receiving information can be transmitted by the base station to the terminal through Downlink Control Information (DCI) in the PDCCH, and after the terminal obtains the receiving information by parsing, the terminal performs downlink reception on the corresponding beam using the corresponding antenna panel.

In 405, the base station transmits downlink control information to the terminal according to a time domain interval between every two adjacent mini-slots in the at least two mini-slots. Accordingly, the terminal receives the downlink control information.

In the embodiment of the present disclosure, the base station may deliver the downlink control information to the terminal through DCI signaling.

In 406, the terminal obtains, from the downlink control information, a time domain interval between every two adjacent mini-slots in the at least two mini-slots for transmitting the downlink data.

In the embodiment of the present disclosure, after receiving the DCI and when parsing the DCI, the terminal first obtains the time domain interval between every two adjacent mini-slots in all of the mini-slots scheduled by the DCI.

In 407, the terminal determines a beam relationship according to the time domain interval between every two adjacent mini-slots in the at least two mini-slots.

The beam relationship indicates a relationship between receiving beams of the at least two mini-slots.

Optionally, when determining the beam relationship according to the time domain interval between every two adjacent mini-slots in the at least two mini-slots, the terminal may obtain the mini-slot interval threshold value information, for any two adjacent mini-slots of the at least two mini-slots, a magnitude relationship between a time domain interval between the two adjacent mini-slots and a time domain interval indicated by the mini-slot interval threshold value information is obtained, and the relationship between the receiving beams of the two adjacent mini-slots is determined according to the magnitude relationship.

In each mini-slot scheduled by the DCI, the time domain interval between every two adjacent mini-slots is set by the base station according to the antenna capability information. Therefore, the terminal may preliminarily determine the relationship between the receiving beams of every two adjacent mini-slots according to the time domain interval between every two adjacent mini-slots and in combination with the mini-slot interval threshold value information. For example, whether the two adjacent mini-slots use the same beam or the same antenna panel for reception is determined.

A manner in which the terminal obtains the mini-slot interval threshold value information is similar to a manner in which the base station obtains the mini-slot interval threshold value information, and details are not repeated herein.

When the base station schedules the PDSCH resource of the mini-slot for the terminal, the base station takes consideration of the receiving antenna panel and the receiving beam used by the terminal for each mini-slot, and set a time domain interval between the mini-slots according to the information about the receiving antenna panel and the receiving beam and the time required for switching of the antenna panels or beams given in the antenna panel capability of the terminal.

In 408, the terminal obtains the respective receiving information of the at least two mini-slots according to the beam relationship and the downlink control information.

In a possible solution, when the respective receiving information of the at least two mini-slots is obtained according to the beam relationship and the downlink control information, for a specified mini-slot of the at least two mini-slots, the terminal may obtain receiving information corresponding to the downlink control information as receiving information of the specified mini-slot, or the terminal may obtain receiving information of other Control Resource Set (CORESETs) as receiving information of the specified mini-slot, the other CORESET is a CORESET other than the CORESET corresponding to the downlink control information in a same CORESET set or a same TRP as the CORESET corresponding to the downlink control information. The time domain interval between a starting time domain position of the specified mini-slot and an ending time domain position of the downlink control information is less than a specified time domain interval threshold value. For other mini-slots, receiving information of the other mini-slot is obtained from the downlink control information, the other mini-slot is a mini-slot of the at least two mini-slots other than the specified mini-slot.

After receiving the DCI, the terminal needs to parse the information carried in the DCI, and it takes a certain time to parse and obtain the receiving information in the DCI. That is, for the mini-slot which is transmitted after the DCI and has a time domain interval from the ending time of the DCI less than a certain threshold, there may not be enough time by the terminal to obtain the receiving information (that is, the antenna panel and the beam used for reception) of the mini-slot from the DCI. If all the mini-slots scheduled by the DCI are transmitted in a time domain beyond a certain threshold after the DCI, a certain transmission delay will be caused. Therefore, in the embodiments of the present disclosure, when the receiving information of each mini-slot scheduled by the DCI is set, for a mini-slot in the time domain within a certain threshold after the DCI (corresponding to the specified mini-slot), the system determines that receiving information of the mini-slot is the same as that of the DCI by default. For a mini-slot (corresponding to the other mini-slot mentioned above) in the time domain beyond a certain threshold after the DCI, receiving information of the mini-slot can be indicated in the DCI by the base station.

In 409, the terminal receives downlink data in a time domain corresponding to the at least two mini-slots according to respective receiving information of the at least two mini-slots.

For example, for two consecutive mini-slots, the base station instructs the terminal to use the same receiving antenna panel and receiving beam, and the time domain interval between the two mini-slots may be 0. Similarly, if the terminal determines that the time domain interval between multiple mini-slots is 0 by parsing the DCI, the terminal may determine that the mini-slots use the same receiving antenna and receiving beam, and further obtain the receiving antenna and the receiving beam which the mini-slots uses according to the DCI signaling transmitted by the base station.

For another example, if two consecutive mini-slots require the terminal to use the beams on the two antenna panels that are activated simultaneously for receiving, the base station may configure a time domain interval between the two mini-slots to be greater than or equal to T3, and less than the other threshold values greater than T3 in the mini-slot interval threshold value information. The terminal may parse the DCI to obtain the time domain interval between the two mini-slots, and compare the obtained time domain interval with each threshold value in the mini-slot interval threshold value information to find out the greatest threshold value less than the time domain interval, and determine the greatest threshold value of them as T3. The terminal may acquire that the two mini-slots use receiving beams on different activated antenna panels, and then acquire the receiving beam on the antenna panel corresponding to each of the two mini-slots according to the DCI signaling. For each of the two mini-slots, the terminal prepares to use the antenna panel and the receiving beam corresponding to the mini-slot to receive a PDSCH of the mini-slot.

In addition, for a PDCCH carrying DCI for scheduling a plurality of mini-slots, if a time domain interval between a starting symbol position of one or more mini-slots and an ending symbol position of the PDCCH is less than a threshold value, the mini-slots cannot use receiving beam information indicated in the DCI, and need to use the same receiving beam information as the PDCCH (that is, receiving information corresponding to the DCI). Because the time domain interval is too small, the terminal cannot decode beam information in the DCI signaling, and can only use the same receiving beam as the PDCCH beam to receive the PDSCHs of the mini-slots. After decoding the receiving beam corresponding to subsequent mini-slots in the DCI, the terminal uses the receiving beam to receive PDSCHs of one or more subsequent mini-slots.

Figure 5:
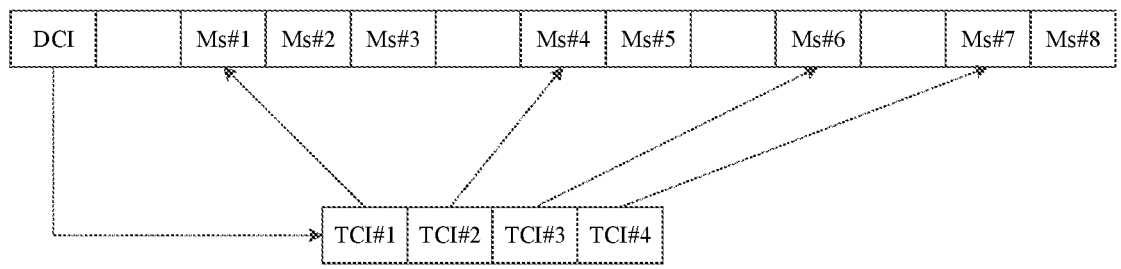
FIG. 5 is a schematic diagram of resource scheduling according to the embodiment shown in FIG. 4.

For example, referring to FIG. 5, which shows a schematic diagram of resource scheduling according to an embodiment of the present disclosure, as shown in FIG. 5, DCI signaling indicates that the base station schedules 8 mini-slots (abbreviated as Ms) through 4 TCI states (i.e., TCI #1-TCI #4) for transmitting downlink data to the terminal, the 8 mini-slots are respectively Ms #1-Ms #8. There is no time domain interval between the Ms #1-Ms #3, the terminal can determine that the Ms #1-Ms #3 use a same receiving beam direction and correspond to a same TCI state. Accordingly, Ms #4 and Ms #5 use a same TCI state, Ms #6 using a TCI state; Ms #7 and Ms #8 use a same TCI state. Since the DCI signaling gives four TCI states, and a time domain interval between the DCI signaling and Ms #1 is greater than the threshold value, in the embodiment of the present disclosure, the DCI signaling may indicate TCI #1 to the Ms #1, instruct the following Ms #4 and Ms #5 to use TCI #2, instruct Ms #6 to use TCI #3, and instruct Ms #7 and Ms #8 to use TCI #4. A time domain interval between Ms #3 and Ms #4 is greater than or equal to time required for the terminal to switch a receiving beam from a direction indicated by the TCI #1 to a direction indicated by the TCI #2. Likewise, a time domain interval between Ms #5 and Ms #6 is greater than or equal to time required for the terminal to switch a receiving beam from a direction indicated by TCI #2 to a direction indicated by TCI #3, and a time domain interval between Ms #6 and Ms #7 is greater than or equal to time required for the terminal to switch a receiving beam from a direction indicated by TCI #3 to the direction indicated by TCI #4.

If a time domain interval between the DCI signaling and Ms #1 is less than the threshold value, the DCI signaling only needs to give three TCI states. Because Ms #1~Ms #3 use a same receiving beam as the DCI signaling, the following Ms #4 and Ms #5 use TCI #1, Ms #6 uses TCI #2, and Ms #7 and Ms #8 use TCI #3. Similarly, each time domain interval is greater than the time domain interval required for the terminal to switch the beams.

In the embodiment of the present disclosure, when the terminal receives downlink data, the base station determines the maximum number of beam switching in a slot according to the antenna capability information and the current antenna panel state (i.e., antenna panel activation information) of the terminal. For example, the terminal currently activates two antenna panels, and the two antenna panels can perform downlink reception simultaneously, i.e., a value of T3 is very small. For example, when the subcarrier spacing is 30 KHz, the value of T3 is less than one OFDM symbol. Assuming that one slot includes 14 symbols, and the mini-slot is 2 symbols, the terminal can perform beam switching four times in one slot when receiving downlink data. Correspondingly, for other switching times of a larger value, the terminal may perform less beam switching in one slot when receiving downlink data.

In the embodiment of the present disclosure, a plurality of mini-slots that transmit data to the terminal can be used to transmit a plurality of TBs, which may be the same TB transmitted repeatedly, or TBs of different data.

In the solution shown in the embodiment of the present disclosure, the time resource of the mini-slot and the receiving beam resource of each mini-slot are configured according to the antenna panel capability and the current antenna panel state information of the terminal, so that the terminal receives PDSCHs of the plurality of mini-slots using the plurality of receiving beams, thereby improving transmission reliability by using spatial diversity.

In conclusion, according to the solution shown in the embodiments of the present disclosure, the base station may receive antenna capability information of the at least one antenna panel reported by the terminal, determine the mini-slot interval threshold value information according to the antenna capability information, and transmits the downlink control information including the time domain positions of the at least two mini-slots for downlink reception to the terminal according to the determined mini-slot interval threshold value information, so as to control the terminal to receive the downlink data. Therefore, a solution of setting a mini-slot interval of downlink data in combination with the antenna capabilities of the terminal is provided, to avoid setting the time domain interval between adjacent mini-slots too large or too small, thereby improving the transmission efficiency for downlink transmission through the multi-antenna panels.

The device embodiments of the present disclosure are described as follows, which can be used to implement the method embodiments of the present disclosure. For details not disclosed in the device embodiments of the present disclosure, reference may be made to the method embodiments of the present disclosure.

Figure 6:
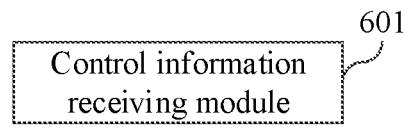
FIG. 6 is a block diagram of a device for downlink data transmission shown in an exemplary embodiment of the present disclosure.

FIG. 6 shows a block diagram of a device for downlink data transmission according to an exemplary embodiment of the present disclosure. As shown in FIG. 6, the device for downlink data transmission may be implemented as all or part of the terminal in the implementation environment shown in FIG. 1 by hardware or a combination of software and hardware to perform the operations performed by the terminal in any of the embodiments shown in FIG. 2 or FIG. 4. The terminal includes N antenna panels, N is an integer greater than or equal to 1, the device for downlink data transmission may include a control information receiving module 601.

The control information receiving module 601 is configured to receive downlink control information. The downlink control information includes time domain locations of at least two mini-slots for downlink reception.

A time domain position of at least one mini-slot is determined according to mini-slot interval threshold value information, and the mini-slot interval threshold value information is determined according to antenna capability information of the N antenna panels. The mini-slot interval threshold value information indicates a minimum time domain interval between adjacent mini-slots in which the terminal receives downlink data.

Optionally, the device further includes: an interval obtaining module, a beam relationship determining module, a receiving information obtaining module and a data receiving module.

The interval obtaining module is configured to obtain, from the downlink control information, a time domain interval between every two adjacent mini-slots in the at least two mini-slots.

The beam relationship determining module is configured to determine a beam relationship according to the time domain interval between every two adjacent mini-slots in the at least two mini-slots. The beam relationship indicates a relationship between receiving beams of the at least two mini-slots.

The receiving information obtaining module is configured to obtain respective receiving information of the at least two mini-slots according to the beam relationship and the downlink control information. The receiving information indicates an antenna panel and a receiving beam for receiving a corresponding mini-slot.

The data receiving module is configured to receive the downlink data in a time domain corresponding to the at least two mini-slots according to respective receiving information of the at least two mini-slots.

Optionally, the beam relationship determining module includes: a threshold value information obtaining sub-module, a magnitude relationship obtaining sub-module and a relationship determining sub-module.

The threshold value information obtaining sub-module is configured to obtain the mini-slot interval threshold value information;

The magnitude relationship obtaining sub-module is configured to obtain, for any two adjacent mini-slots of the at least two mini-slots, a magnitude relationship between a time domain interval between the two adjacent mini-slots and a time domain interval indicated by the mini-slot interval threshold value information.

The relationship determining sub-module is configured to determine a relationship between receiving beams of the two adjacent mini-slots according to the magnitude relationship.

Optionally, the mini-slot interval threshold value information includes at least one of a first time domain interval threshold value T1, a second time domain interval threshold value T2, a third time domain interval threshold value T3, a fourth time domain interval threshold value T4, and a fifth time domain interval threshold value T5.

T1 is a minimum time domain interval for successively receiving downlink data sent in different mini-slots through two antenna panels responsive to that the two antenna panels are capable of being activated simultaneously.

T2 is a minimum time domain interval for successively receiving downlink data sent in different mini-slots through the two antenna panels responsive to that the two antenna panels are not capable of being activated simultaneously.

T3 is a minimum time domain interval for successively receiving downlink data sent in different mini-slots through the two antenna panels responsive to that the two antenna panels are capable of being activated simultaneously and the two antenna panels are capable of performing downlink reception simultaneously.

T4 is a minimum time domain interval for successively receiving downlink data sent in different mini-slots through the two antenna panels responsive to that the two antenna panels are capable of being activated simultaneously and the two antenna panels are not capable of performing downlink reception simultaneously.

T5 is a minimum time domain interval for successively receiving downlink data sent in different mini-slots through a same antenna panel using different receiving beams.

Optionally, the receiving information obtaining module includes: a first receiving information obtaining sub-module and a second receiving information obtaining sub-module.

The first receiving information obtaining sub-module is configured to obtain, for a specified mini-slot of the at least two mini-slots, receiving information corresponding to the downlink control information as receiving information of the specified mini-slot. A time domain interval between a starting time domain position of the specified mini-slot and an ending time domain position of the downlink control information is less than a specified time domain interval threshold value The second receiving information obtaining sub-module is configured to obtain, for other mini-slot, receiving information of the other mini-slot from the downlink control information. The other mini-slot is a mini-slot of the at least two mini-slots other than the specified mini-slot.

Optionally, the device further includes a capability reporting module, configured to report antenna capability information of the N antenna panels.

The antenna capability information includes at least one of: a value of N; whether the N antenna panels are capable of being activated simultaneously when the value of N is greater than or equal to 2; and whether the N antenna panels are capable of performing downlink reception simultaneously when the value of N is greater than or equal to 2 and the N antenna panels are capable of being activated simultaneously.

Optionally, the device further include an activation information interacting module, configured to interact antenna panel activation information with the base station before the control information receiving module receives the downlink control information. The antenna panel activation information indicates an activated antenna panel of the N antenna panels.

The mini-slot interval threshold value information is determined according to the antenna capability information of the N antenna panels and the antenna panel activation information.

Figure 7:
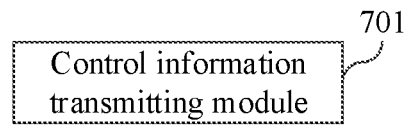
FIG. 7 is a block diagram of a device for downlink data transmission shown in an exemplary embodiment of the present disclosure.

FIG. 7 shows a block diagram of a device for downlink data transmission according to an exemplary embodiment of the present disclosure. As shown in FIG. 7, the device for downlink data transmission may be implemented as all or part of the base station in the implementation environment shown in FIG. 1 by hardware or a combination of software and hardware to perform the operations performed by the base station in any of the embodiments shown in FIG. 3 or FIG. 4. The device for downlink data transmission may include a control information transmitting module 701.

The control information transmitting module 701 is configured to transmit downlink control information to a terminal. The downlink control information includes time domain locations of at least two mini-slots for downlink reception.

A time domain position of at least one mini-slot is determined according to mini-slot interval threshold value information, the mini-slot interval threshold value information is determined according to antenna capability information of the N antenna panels in the terminal, the mini-slot interval threshold value information indicates a minimum time domain interval between adjacent mini-slots in which the terminal receives downlink data, and N is an integer greater than or equal to 1.

Optionally, the device further includes a time domain interval determining module.

The time domain interval determining module is configured to, before the control information transmitting module transmits the downlink control information to the terminal, determine a time domain interval between every two adjacent mini-slots of the at least two mini-slots according to the mini-slot interval threshold value information and respective receiving information of the at least two mini-slots for transmitting downlink data to the terminal. The receiving information indicates an antenna panel and a receiving beam of the terminal for receiving a corresponding mini-slot.

The control information transmitting module is configured to transmit the downlink control information to the terminal according to a time domain interval between every two adjacent mini-slots in the at least two mini-slots.

Optionally, the mini-slot interval threshold value information includes at least one of a first time domain interval threshold value T1, a second time domain interval threshold value T2, a third time domain interval threshold value T3, a fourth time domain interval threshold value T4, and a fifth time domain interval threshold value T5.

T1 is a minimum time domain interval for successively receiving downlink data sent in different mini-slots through two antenna panels responsive to that the two antenna panels are capable of being activated simultaneously.

T2 is a minimum time domain interval for successively receiving downlink data sent in different mini-slots through the two antenna panels responsive to that the two antenna panels are not capable of being activated simultaneously.

T3 is a minimum time domain interval for successively receiving downlink data sent in different mini-slots through the two antenna panels responsive to that the two antenna panels are capable of being activated simultaneously and the two antenna panels are capable of performing downlink reception simultaneously.

T4 is a minimum time domain interval for successively receiving downlink data sent in different mini-slots through the two antenna panels responsive to that the two antenna panels are capable of being activated simultaneously and the two antenna panels are not capable of performing downlink reception simultaneously.

T5 is a minimum time domain interval for successively receiving downlink data sent in different mini-slots through a same antenna panel using different receiving beams.

Optionally, the device further includes a mini-slot receiving module, configured to receive, for a specified mini-slot of the at least two mini-slots, data in the specified mini-slot according to receiving information corresponding to the downlink control information. A time domain interval between a starting time domain position of the specified mini-slot and an ending time domain position of the downlink control information is less than a specified time domain interval threshold value.

Optionally, the device further includes a capability information receiving module, configured to receive antenna capability information of the N antenna panels reported by the terminal before the control information transmitting module transmits the downlink control information to the terminal.

The antenna capability information includes at least one of: a value of N; whether the N antenna panels are capable of being activated simultaneously when the value of N is greater than or equal to 2; and whether the N antenna panels are capable of performing downlink reception simultaneously when the value of N is greater than or equal to 2 and the N antenna panels are capable of being activated simultaneously.

Optionally, the device further includes: an activation information interacting module, and a threshold value information generating module.

The activation information interacting module is configured to interact antenna panel activation information with the terminal before the control information transmitting module transmits the downlink control information to the terminal. The antenna panel activation information indicates an activated antenna panel of the N antenna panels.

The threshold value information generating module is configured to determine the mini-slot interval threshold value information according to the antenna panel activation information and the antenna capability information.

An exemplary embodiment of the present disclosure further provides a device for downlink data transmission that can be implemented as all or part of a terminal in the system shown in FIG. 1 to perform all or part of the operations performed by the terminal in the embodiment shown in FIG. 2 or FIG. 4 described above of the present disclosure. The terminal includes N antenna panels, N is an integer greater than or equal to 1, the device for downlink data transmission includes a processor, a memory for storing processor-executable instructions.

The processor is configured to receive downlink control information. The downlink control information includes time domain locations of at least two mini-slots for downlink reception.

A time domain position of at least one mini-slot is determined according to mini-slot interval threshold value information, the mini-slot interval threshold value information is determined according to antenna capability information of the N antenna panels, and the mini-slot interval threshold value information indicates a minimum time domain interval between adjacent mini-slots in which the terminal receives downlink data.

Optionally, the processor is further configured to: obtain, from the downlink control information, a time domain interval between every two adjacent mini-slots in the at least two mini-slots; determine a beam relationship according to the time domain interval between every two adjacent mini-slots in the at least two mini-slots, where the beam relationship indicates a relationship between receiving beams of the at least two mini-slots; obtain respective receiving information of the at least two mini-slots according to the beam relationship and the downlink control information, where the receiving information indicates an antenna panel and a receiving beam for receiving a corresponding mini-slot; and receive the downlink data in a time domain corresponding to the at least two mini-slots according to respective receiving information of the at least two mini-slots.

Optionally, the operation that beam relationship is determined according to the time domain interval between every two adjacent mini-slots in the at least two mini-slots includes operations as follows.

The mini-slot interval threshold value information is obtained.

For any two adjacent mini-slots of the at least two mini-slots, a magnitude relationship between a time domain interval between the two adjacent mini-slots and a time domain interval indicated by the mini-slot interval threshold value information is obtained.

A relationship between receiving beams of the two adjacent mini-slots is determined according to the magnitude relationship.

Optionally, the mini-slot interval threshold value information includes at least one of a first time domain interval threshold value T1, a second time domain interval threshold value T2, a third time domain interval threshold value T3, a fourth time domain interval threshold value T4, and a fifth time domain interval threshold value T5.

T1 is a minimum time domain interval for successively receiving downlink data sent in different mini-slots through two antenna panels responsive to that the two antenna panels are capable of being activated simultaneously.

T2 is a minimum time domain interval for successively receiving downlink data sent in different mini-slots through the two antenna panels responsive to that the two antenna panels are not capable of being activated simultaneously.

T3 is a minimum time domain interval for successively receiving downlink data sent in different mini-slots through the two antenna panels responsive to that the two antenna panels are capable of being activated simultaneously and the two antenna panels are capable of performing downlink reception simultaneously.

T4 is a minimum time domain interval for successively receiving downlink data sent in different mini-slots through the two antenna panels responsive to that the two antenna panels are capable of being activated simultaneously and the two antenna panels are not capable of performing downlink reception simultaneously.

T5 is a minimum time domain interval for successively receiving downlink data sent in different mini-slots through a same antenna panel using different receiving beams.

Optionally, the respective receiving information of the at least two mini-slots is obtained according to the beam relationship and the downlink control information includes operations as follows.

For a specified mini-slot of the at least two mini-slots, receiving information corresponding to the downlink control information is obtained as receiving information of the specified mini-slot, a time domain interval between a starting time domain position of the specified mini-slot and an ending time domain position of the downlink control information is less than a specified time domain interval threshold value.

For other mini-slot, receiving information of the other mini-slot is obtained from the downlink control information. The other mini-slot is a mini-slot of the at least two mini-slots other than the specified mini-slot.

Optionally, before the downlink control information is received, the processor is further configured to report antenna capability information of the N antenna panels.

The antenna capability information includes at least one of: a value of N; whether the N antenna panels are capable of being activated simultaneously when the value of N is greater than or equal to 2; and whether the N antenna panels are capable of performing downlink reception simultaneously when the value of N is greater than or equal to 2 and the N antenna panels are capable of being activated simultaneously.

Optionally, before the downlink control information is received, the device further includes interacting antenna panel activation information with the base station, where the antenna panel activation information indicates an activated antenna panel of the N antenna panels.

The mini-slot interval threshold value information is determined according to antenna capability information of the N antenna panels and the antenna panel activation information.

An exemplary embodiment of the present disclosure further provides a device for downlink data transmission that can be implemented as all or part of a base station in the system shown in FIG. 1 to perform all or part of the operations performed by the base station in the embodiment shown in FIG. 3 or FIG. 4 described above of the present disclosure. The device for downlink data transmission includes a processor, a memory for storing processor-executable instructions.

The processor is configured to transmit downlink control information to a terminal, where the downlink control information includes time domain locations of at least two mini-slots for downlink reception.

A time domain position of at least one mini-slot is determined according to mini-slot interval threshold value information, the mini-slot interval threshold value information is determined according to antenna capability information of the N antenna panels in the terminal, the mini-slot interval threshold value information indicates a minimum time domain interval between adjacent mini-slots in which the terminal receives downlink data, and N is an integer greater than or equal to 1.

Optionally, before the downlink control information is transmitted to the terminal, the processor is configured to: determine a time domain interval between every two adjacent mini-slots of the at least two mini-slots according to the mini-slot interval threshold value information and respective receiving information of the at least two mini-slots, where the receiving information indicates an antenna panel and a receiving beam of the terminal for receiving a corresponding mini-slot.

The operation that the downlink control information is transmitted to the terminal includes an operation as follows.

The downlink control information is transmitted to the terminal according to a time domain interval between every two adjacent mini-slots in the at least two mini-slots.

Optionally, the mini-slot interval threshold value information includes at least one of a first time domain interval threshold value T1, a second time domain interval threshold value T2, a third time domain interval threshold value T3, a fourth time domain interval threshold value T4, and a fifth time domain interval threshold value T5.

T1 is a minimum time domain interval for successively receiving downlink data sent in different mini-slots through two antenna panels responsive to that the two antenna panels are capable of being activated simultaneously.

T2 is a minimum time domain interval for successively receiving downlink data sent in different mini-slots through the two antenna panels responsive to that the two antenna panels are not capable of being activated simultaneously.

T3 is a minimum time domain interval for successively receiving downlink data sent in different mini-slots through the two antenna panels responsive to that the two antenna panels are capable of being activated simultaneously and the two antenna panels are capable of performing downlink reception simultaneously.

T4 is a minimum time domain interval for successively receiving downlink data sent in different mini-slots through the two antenna panels responsive to that the two antenna panels are capable of being activated simultaneously and the two antenna panels are not capable of performing downlink reception simultaneously.

T5 is a minimum time domain interval for successively receiving downlink data sent in different mini-slots through a same antenna panel using different receiving beams.

Optionally, the processor is further configured to: for a specified mini-slot of the at least two mini-slots, receive data in the specified mini-slot according to receiving information corresponding to the downlink control information. A time domain interval between a starting time domain position of the specified mini-slot and an ending time domain position of the downlink control information is less than a specified time domain interval threshold value.

Optionally, before the downlink control information is transmitted to the terminal, the processor is further configured to receive antenna capability information of the N antenna panels reported by the terminal.

The antenna capability information includes at least one of: a value of N; whether the N antenna panels are capable of being activated simultaneously when the value of N is greater than or equal to 2; and whether the N antenna panels are capable of performing downlink reception simultaneously when the value of N is greater than or equal to 2 and the N antenna panels are capable of being activated simultaneously.

Optionally, before the downlink control information is transmitted to the terminal, the processor is further configured to interact antenna panel activation information with the terminal, where the antenna panel activation information indicates an activated antenna panel of the N antenna panels; and determine the mini-slot interval threshold value information according to the antenna panel activation information and the antenna capability information.

The solutions provided in the embodiments of the present disclosure are described above mainly from the perspective of interaction between the terminal and the base station. It will be understood that the terminal and the base station include respective hardware structures and/or software modules for performing respective functions in order to implement the above-described functions. The embodiments of the present disclosure can be implemented in hardware or a combination of hardware and computer software in combination with exemplary units and algorithm operations described in connection with the embodiments disclosed in the present disclosure. Whether a function is performed by hardware or computer software driven hardware depends on the particular application and design constraints of the technical solution. A person skilled in the art may implement the described functions using different methods for each particular application, but such implementation should not be considered beyond the scope of the technical solutions of the embodiments of the present disclosure.

Figure 8:
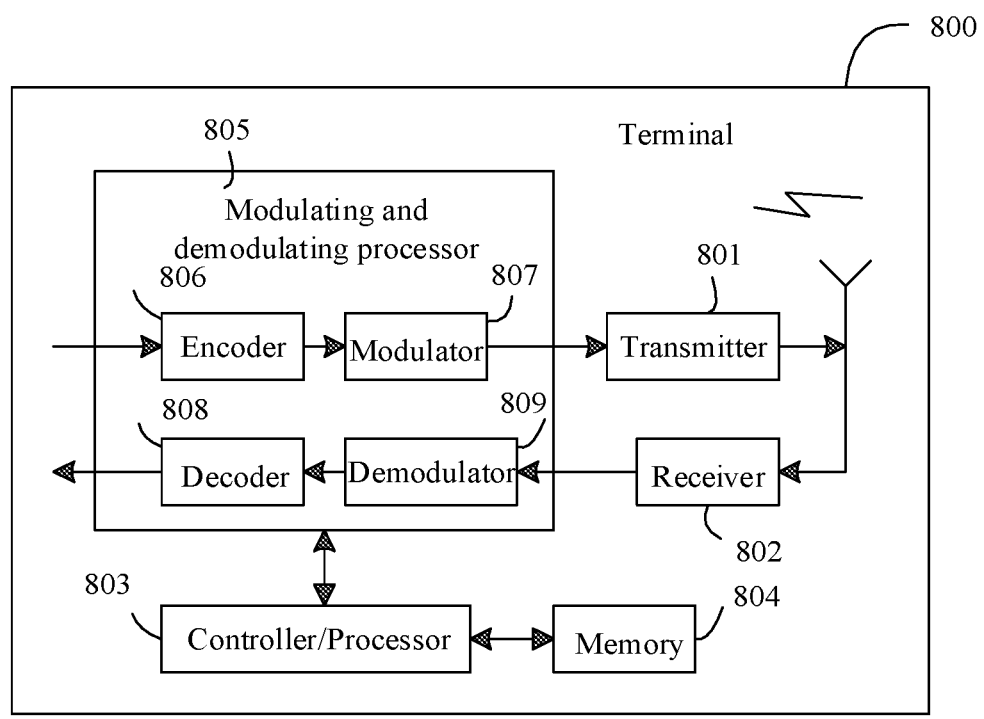
FIG. 8 is a schematic structural diagram of a terminal shown in an exemplary embodiment of the present disclosure.

FIG. 8 shows a schematic structural diagram of a terminal according to an exemplary embodiment of the present disclosure.

The terminal 800 includes a transmitter 801, a receiver 802, and a processor 803. The processor 803 may also be a controller, which is denoted as "controller/processor 803" in FIG. 8. Optionally, the terminal 800 may further include a modulating-demodulating processor 805, where the modulating-demodulating processor 805 may include an encoder 806, a modulator 807, a decoder 808 and a demodulator 809.

In one example, the transmitter 801 regulates (e.g., analog convents, filters, amplifies, and up-converts, etc.) an output sample and generates an uplink signal that is transmitted via an antenna to the base station described in the above-described embodiments. In the downlink, the antenna receives the downlink signal transmitted by the base station in the embodiments described above. The receiver 802 regulates (e.g., filters, amplifies, down-converts, and digitizes, etc.) a signal received from the antenna and provides an input sample. In the modulating-demodulating processor 805, the encoder 806 receives traffic data and signaling messages to be transmitted on the uplink and processes (e.g., formats, encodes, and interleaves) the traffic data and signaling messages. The modulator 807 further processes (e.g., symbol maps and modulates) traffic data and signaling messages after encoding and provides an output sample. The demodulator 809 processes (e.g., demodulates) the input sample and provides symbol estimation. The decoder 808 processes (e.g., de-interleaves and decodes) the symbol estimation and provides the decoded data and signaling messages transmitted to the terminal 800. The encoder 806, the modulator 807, the demodulator 809, and the decoder 808 may be implemented by a combined modulating-demodulating processor 805. These units are processed according to radio access technologies (e.g., access technologies of LTE and other evolved systems) employed by radio access networks. It should be noted that when the terminal 800 does not include the modulating-demodulating processor 805, the above-described functions of the modulating-demodulating processor 805 may also be performed by the processor 803.

The processor 803 controls and manages the operation of the terminal 800, and is configured to execute the processing procedure performed by the terminal 800 in the embodiments of the present disclosure. For example, the processor 803 is further configured to perform the various operations of the terminal side in the method embodiments described above, and/or other operations of the technical solution described in the embodiments of the present disclosure.

Furthermore, the terminal 800 may further include a memory 804 for storing program code and data for the terminal 800.

It will be appreciated that FIG. 8 shows only a simplified design of the terminal 800. In practical application, the terminal 800 may include any number of transmitters, receivers, processors, modulating-demodulating processors, memories, etc., and all terminals that may implement the embodiments of the present disclosure are within the protection scope of the embodiments of the present disclosure.

Figure 9:
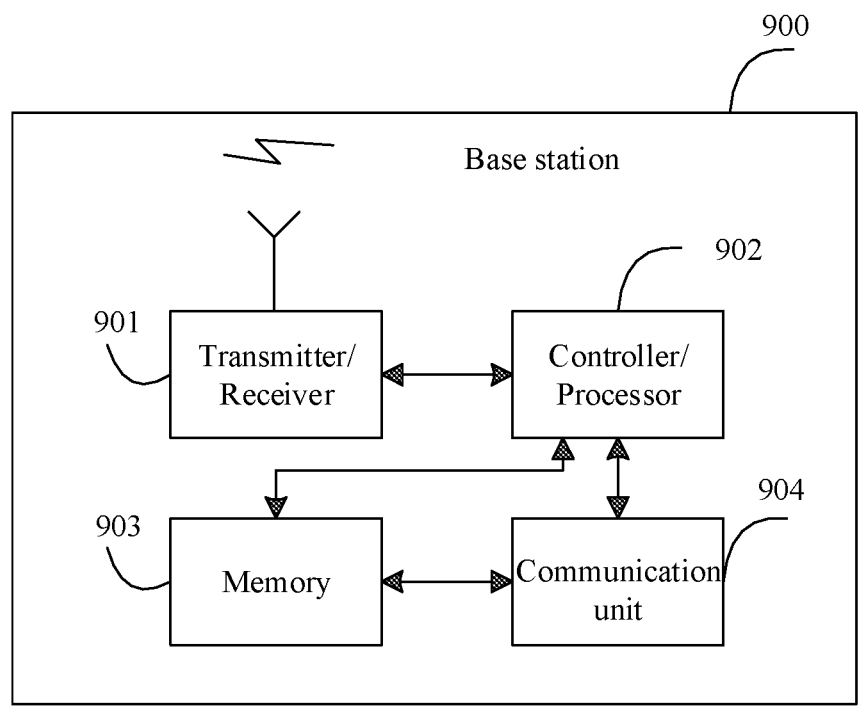
FIG. 9 is a schematic structural diagram of a base station shown in an exemplary embodiment of the present disclosure.

FIG. 9 shows a schematic structural diagram of a base station according to an exemplary embodiment of the present disclosure.

The base station 900 includes a transmitter/receiver 901, and a processor 902. The processor 902 may also be a controller, which is denoted as "controller/processor 902" in FIG. 9. The transmitter/receiver 901 is configured to support information transmission and reception between the base station and the terminal in the above-described embodiments, and to support communication between the base station and other network entities. The processor 902 performs various functions for communicating with the terminal. On the uplink, the uplink signal from the terminal is received via the antenna, demodulated (e.g., demodulated from a high frequency signal to a baseband signal) by the receiver 901, and further processed by the processor 902 to recover the traffic data and signaling messages transmitted by the terminal. On the downlink, the traffic data and signaling messages are processed by the processor 902, modulated (e.g., baseband signals are modulated into high frequency signals) by transmitter 901 to produce downlink signals, and transmitted to the terminal via the antenna. It should be noted that the demodulation or modulation functions described above may also be performed by the processor 902. For example, the processor 902 is further configured to perform the various operations of the base station in the method embodiments described above, and/or other operations of the technical solution described in the embodiments of the present disclosure.

Furthermore, the base station 900 may further include a memory 903 for storing program code and data for the base station 900. In addition, the base station 900 may further include a communication unit 904. The communication unit 904 is configured to support the base station 900 in communicating with other network entities (such as network devices in a core network). For example, in a 5G NR system, the communication unit 904 may be an NG-U interface for supporting the base station 900 to communicate with a User Plane Function (UPF) entity. Alternatively, the communication unit 904 may be an NG-C interface for supporting the base station 900 to communicate with an Access and Mobility Management Function (AMF) entity.

It will be appreciated that FIG. 9 shows only a simplified design of the base station 900. In practical application, the base station 900 may include any number of transmitters, receivers, processors, controllers, memories, communication units, etc., and all base stations that may implement the embodiments of the present disclosure are within the protection scope of the embodiments of the present disclosure.

It should be appreciated by those skilled in the art that, in the one or more examples described above, the functions described in the embodiments of the present disclosure may be implemented in hardware, software, firmware, or any combination thereof. When implemented by software, these functions may be stored in or transmitted as one or more instructions or codes on a computer-readable medium. The computer-readable medium includes a computer storage medium and a communication medium, where the communication medium includes any medium that facilitates the transfer of a computer program from one place to another. The storage medium may be any available medium that can be accessed by a general purpose or special purpose computer.

The embodiments of the present disclosure further provide a computer storage medium for storing computer software instructions used for the first device, which includes a program designed to perform the method for downlink data transmission.

It should be understood that the "plurality" mentioned herein refers to two or more. "And/or" describes an association relationship of the associated object, indicating that there can be three types of relationships, for example, A and/or B, which may indicate that: A exists alone, A and B exist simultaneously, and B exists alone. The character "/" generally indicates that the associated objects are in an "or" relationship.

Other embodiments of the present disclosure will be apparent to those skilled in the art from consideration of the specification and practice of the present disclosure disclosed here. The disclosure is intended to cover any variations, uses, or adaptations of the disclosure which conform to the general principles thereof and include such departures from the present disclosure as come within known or customary practice in the art. The specification and examples are merely exemplary, with a true scope and spirit of the disclosure being indicated by the following claims.

It will be understood that the present disclosure is not limited to the exact construction that has been described above and illustrated in the accompanying drawings, and that various modifications and changes may be made without departing from the scope thereof. The scope of the present disclosure is only limited by the appended claims.

The invention claimed is:

1. A method for downlink data transmission, applied to a terminal, the method comprising:
    receiving downlink control information, wherein the downlink control information comprises time domain locations of at least two mini-slots for downlink reception, wherein the terminal comprises N antenna panels and wherein N is an integer greater than or equal to 1;
    wherein a time domain position of at least one mini-slot of the at least two mini-slots is determined according to mini-slot interval threshold value information, wherein the mini-slot interval threshold value information is determined according to antenna capability information of the N antenna panels, and wherein the mini-slot interval threshold value information indicates a minimum time domain interval between adjacent mini-slots in which the terminal receives downlink data.

2. The method of claim 1, further comprising:
    obtaining, from the downlink control information, a time domain interval between every two adjacent mini-slots in the at least two mini-slots;
    determining a beam relationship according to the time domain interval between every two adjacent mini-slots in the at least two mini-slots, wherein the beam relationship indicates a relationship between receiving beams of the at least two mini-slots;
    obtaining respective receiving information of the at least two mini-slots according to the beam relationship and the downlink control information, wherein the receiving information of the mini-slot indicates an antenna panel and a receiving beam for receiving the mini-slot; and
    receiving the downlink data in a time domain corresponding to the at least two mini-slots according to respective receiving information of the at least two mini-slots.

3. The method of claim 2, wherein the determining the beam relationship according to the time domain interval between every two adjacent mini-slots in the at least two mini-slots comprises:
obtaining the mini-slot interval threshold value information;
for any two adjacent mini-slots of the at least two mini-slots, obtaining a magnitude relationship between a time domain interval between the two adjacent mini-slots and a time domain interval indicated by the mini-slot interval threshold value information; and
determining a relationship between receiving beams of the two adjacent mini-slots according to the magnitude relationship.

4. The method of claim 3, wherein the mini-slot interval threshold value information comprises at least one of a first time domain interval threshold value T1, a second time domain interval threshold value T2, a third time domain interval threshold value T3, a fourth time domain interval threshold value T4 and a fifth time domain interval threshold value T5,
wherein T1 is a minimum time domain interval for successively receiving downlink data sent in different mini-slots through two antenna panels responsive to that the two antenna panels are capable of being activated simultaneously;
wherein T2 is a minimum time domain interval for successively receiving downlink data sent in different mini-slots through the two antenna panels responsive to that the two antenna panels are not capable of being activated simultaneously;
wherein T3 is a minimum time domain interval for successively receiving downlink data sent in different mini-slots through the two antenna panels responsive to that the two antenna panels are capable of being activated simultaneously and the two antenna panels are capable of performing downlink reception simultaneously;
wherein T4 is a minimum time domain interval for successively receiving downlink data sent in different mini-slots through the two antenna panels responsive to that the two antenna panels are capable of being activated simultaneously and the two antenna panels are not capable of performing downlink reception simultaneously; and
wherein T5 is a minimum time domain interval for successively receiving downlink data sent in different mini-slots through a same antenna panel using different receiving beams.

5. The method of claim 2, wherein the obtaining respective receiving information of the at least two mini-slots according to the beam relationship and the downlink control information comprises:
for a specified mini-slot of the at least two mini-slots, obtaining receiving information corresponding to the downlink control information as receiving information of the specified mini-slot, wherein a time domain interval between a starting time domain position of the specified mini-slot and an ending time domain position of the downlink control information is less than a specified time domain interval threshold value; and
for other mini-slot, obtaining receiving information of the other mini-slot from the downlink control information, wherein the other mini-slot is a mini-slot of the at least two mini-slots other than the specified mini-slot.

6. The method of claim 1, further comprising:
reporting, before receiving the downlink control information, antenna capability information of the N antenna panels;
wherein the antenna capability information comprises at least one of:
a value of N;
whether the N antenna panels are capable of being activated simultaneously when the value of N is greater than or equal to 2; and
whether the N antenna panels are capable of performing downlink reception simultaneously when the value of N is greater than or equal to 2 and the N antenna panels are capable of being activated simultaneously.

7. The method of claim 1, further comprising:
interacting, before receiving the downlink control information, antenna panel activation information with the base station, wherein the antenna panel activation information indicates an activated antenna panel of the N antenna panels;
wherein the mini-slot interval threshold value information is determined according to the antenna capability information of the N antenna panels and the antenna panel activation information.

8. A method for downlink data transmission, applied to a base station, the method comprising:
transmitting downlink control information to a terminal, wherein the downlink control information comprises time domain locations of at least two mini-slots for downlink reception;
wherein a time domain position of at least one mini-slot of the at least two mini-slots is determined according to mini-slot interval threshold value information, wherein the mini-slot interval threshold value information is determined according to antenna capability information of N antenna panels in the terminal, wherein the mini-slot interval threshold value information indicates a minimum time domain interval between adjacent mini-slots in which the terminal receives downlink data, and wherein N is an integer greater than or equal to 1.

9. The method of claim 8, further comprising:
determining, before transmitting the downlink control information to the terminal, a time domain interval between every two adjacent mini-slots of the at least two mini-slots according to the mini-slot interval threshold value information and respective receiving information of the at least two mini-slots, wherein the receiving information of the mini-slot indicates an antenna panel and a receiving beam of the terminal for receiving the mini-slot;
wherein the transmitting the downlink control information to the terminal comprises:
transmitting the downlink control information to the terminal according to the time domain interval between every two adjacent mini-slots in the at least two mini-slots.

10. The method of claim 9, wherein the mini-slot interval threshold value information comprises at least one of a first time domain interval threshold value T1, a second time domain interval threshold value T2, a third time domain interval threshold value T3, a fourth time domain interval threshold value T4 and a fifth time domain interval threshold value T5;

wherein T1 is a minimum time domain interval for successively receiving downlink data sent in different mini-slots through two antenna panels responsive to that the two antenna panels are capable of being activated simultaneously;

wherein T2 is a minimum time domain interval for successively receiving downlink data sent in different mini-slots through the two antenna panels responsive to that the two antenna panels are not capable of being activated simultaneously;

wherein T3 is a minimum time domain interval for successively receiving downlink data sent in different mini-slots through the two antenna panels responsive to that the two antenna panels are capable of being activated simultaneously and the two antenna panels are capable of performing downlink reception simultaneously;

wherein T4 is a minimum time domain interval for successively receiving downlink data sent in different mini-slots through the two antenna panels responsive to that the two antenna panels are capable of being activated simultaneously and the two antenna panels are not capable of performing downlink reception simultaneously; and wherein T5 is a minimum time domain interval for successively receiving downlink data sent in different mini-slots through a same antenna panel using different receiving beams.

11. The method of claim 9, further comprising:

for a specified mini-slot of the at least two mini-slots, receiving data in the specified mini-slot according to receiving information corresponding to the downlink control information, wherein a time domain interval between a starting time domain position of the specified mini-slot and an ending time domain position of the downlink control information is less than a specified time domain interval threshold value.

12. The method of claim 8, further comprising:

receiving, before transmitting the downlink control information to the terminal, the antenna capability information of the N antenna panels reported by the terminal;

wherein the antenna capability information comprises at least one of:
 a value of N;
 whether the N antenna panels are capable of being activated simultaneously when the value of N is greater than or equal to 2; and
 whether the N antenna panels are capable of performing downlink reception simultaneously when the value of N is greater than or equal to 2 and the N antenna panels are capable of being activated simultaneously.

13. The method of claim 8, further comprising:

interacting, before transmitting the downlink control information to the terminal, antenna panel activation information with the terminal, wherein the antenna panel activation information indicates an activated antenna panel of the N antenna panels; and determining the mini-slot interval threshold value information according to the antenna panel activation information and the antenna capability information.

14. A device comprising:
 aone or more processors;
 a non-transitory computer-readable storage medium configured for storing instructions executable by the one or more processors; and
 a receiver,
 wherein the one or more processors are configured to:
  control the receiver to receive downlink control information, wherein the downlink control information comprises time domain locations of at least two mini-slots for downlink reception;
  wherein a time domain position of at least one mini-slot of the at least two mini-slots is determined according to mini-slot interval threshold value information, the mini-slot interval threshold value is determined according to antenna capability information of the N antenna panels, and the mini-slot interval threshold value information indicates a minimum time domain interval between adjacent mini-slots in which a terminal receives downlink data, wherein the terminal comprises N antenna panels, wherein N is an integer greater than or equal to 1.

15. The device of claim 14, wherein the one or more processors are further configured to:
 obtain, from the downlink control information, a time domain interval between every two adjacent mini-slots in the at least two mini-slots;
 determine a beam relationship according to the time domain interval between every two adjacent mini-slots in the at least two mini-slots, wherein the beam relationship indicates a relationship between receiving beams of the at least two mini-slots;
 obtain respective receiving information of the at least two mini-slots according to the beam relationship and the downlink control information, wherein the receiving information of the mini-slot indicates an antenna panel and a receiving beam for receiving the mini-slot; and
 control the receiver to receive the downlink data in a time domain corresponding to the at least two mini-slots according to respective receiving information of the at least two mini-slots.

16. The device of claim 15, wherein the one or more processors are further configured to:
 obtain the mini-slot interval threshold value information;
 obtain, for any two adjacent mini-slots of the at least two mini-slots, a magnitude relationship between a time domain interval between the two adjacent mini-slots and a time domain interval indicated by the mini-slot interval threshold value information; and
 determine a relationship between receiving beams of the two adjacent mini-slots according to the magnitude relationship.

17. The device of claim 16, wherein the mini-slot interval threshold value information comprises at least one of a first time domain interval threshold value T1, a second time domain interval threshold value T2, a third time domain interval threshold value T3, a fourth time domain interval threshold value T4 and a fifth time domain interval threshold value T5;

wherein T1 is a minimum time domain interval for successively receiving downlink data sent in different mini-slots through two antenna panels responsive to that the two antenna panels are capable of being activated simultaneously;

wherein T2 is a minimum time domain interval for successively receiving downlink data sent in different mini-slots through the two antenna panels responsive to that the two antenna panels are not capable of being activated simultaneously;

wherein T3 is a minimum time domain interval for successively receiving downlink data sent in different mini-slots through the two antenna panels responsive to that the two antenna panels are capable of being activated simultaneously and the two antenna panels are capable of performing downlink reception simultaneously;

wherein T4 is a minimum time domain interval for successively receiving downlink data sent in different mini-slots through the two antenna panels responsive to that the two antenna panels are capable of being activated simultaneously and the two antenna panels are not capable of performing downlink reception simultaneously; and wherein T5 is a minimum time domain interval for successively receiving downlink data sent in different mini-slots through a same antenna panel using different receiving beams.

18. The device of claim 15, wherein the one or more processors are further configured to:

obtain, for a specified mini-slot of the at least two mini-slots, receiving information corresponding to the downlink control information as receiving information of the specified mini-slot, wherein a time domain interval between a starting time domain position of the specified mini-slot and an ending time domain position of the downlink control information is less than a specified time domain interval threshold value; and obtain, for other mini-slot, receiving information of the other mini-slot from the downlink control information, wherein the other mini-slot is a mini-slot of the at least two mini-slots other than the specified mini-slot.

19. The device of claim 14, wherein the one or more processors are further configured to:

report antenna capability information of the N antenna panels;

wherein the antenna capability information comprises at least one of:
a value of N;
whether the N antenna panels are capable of being activated simultaneously when the value of N is greater than or equal to 2; and
whether the N antenna panels are capable of performing downlink reception simultaneously when the value of N is greater than or equal to 2 and the N antenna panels are capable of being activated simultaneously.

20. The device of claim 14, wherein the one or more processors are further configured to:

interact antenna panel activation information with the base station before controlling the receiver to receives the downlink control information, wherein the antenna panel activation information indicates an activated antenna panel of the N antenna panels;

wherein the mini-slot interval threshold value information is determined according to the antenna capability information of the N antenna panels and the antenna panel activation information.

* * * * *